UNITED STATES PATENT OFFICE.

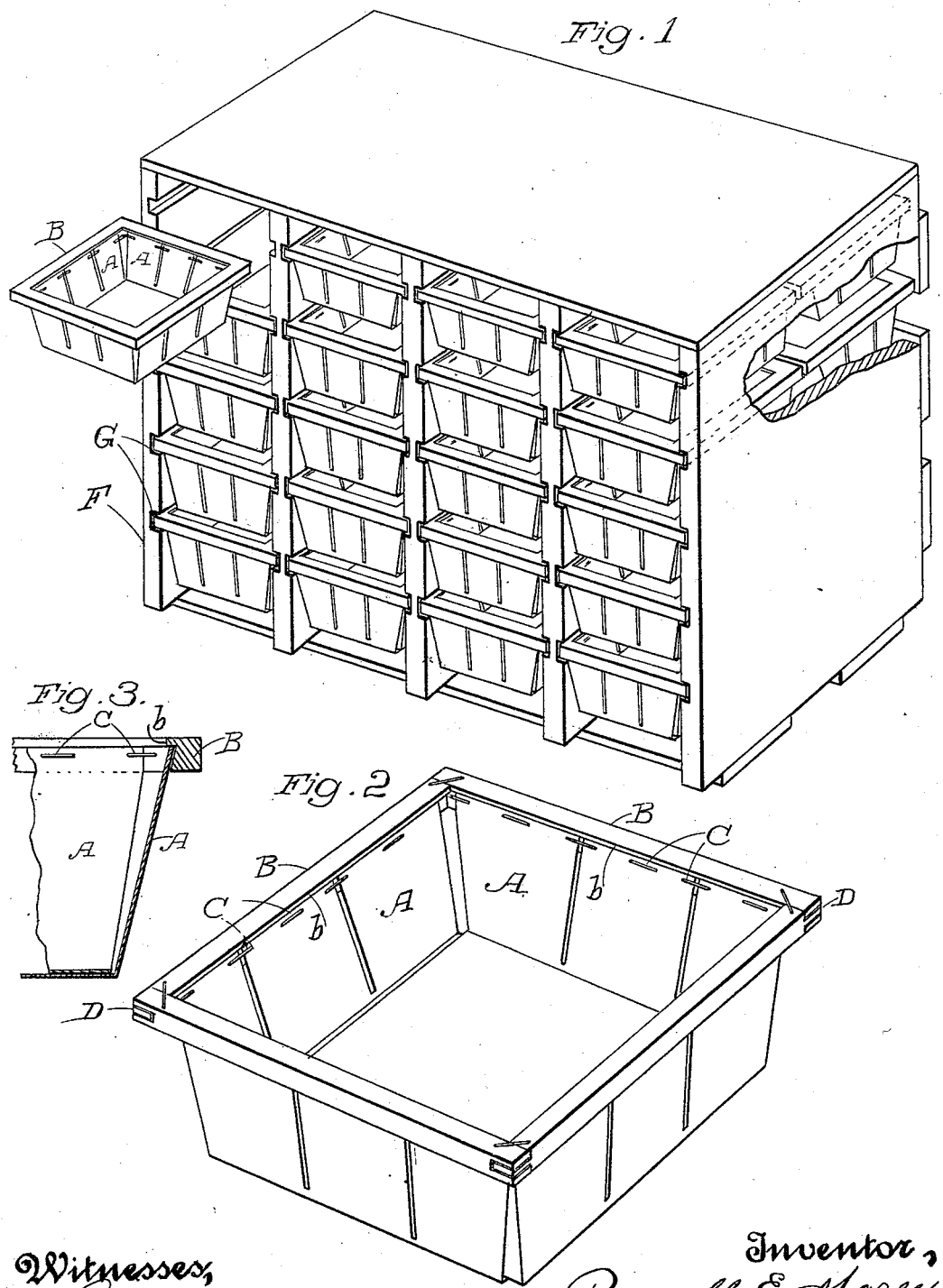

ROSWELL E. MOREY, OF OAKLAND, CALIFORNIA.

FRUIT BASKET AND CRATE.

SPECIFICATION forming part of Letters Patent No. 525,112, dated August 28, 1894.

Application filed June 29, 1894. Serial No. 516,134. (No model.)

*To all whom it may concern:*

Be it known that I, ROSWELL E. MOREY, a citizen of the United States, residing at Oakland, county of Alameda, State of California, have invented an Improvement in Fruit Baskets and Crates; and I hereby declare the following to be a full, clear, and exact description of the same.

My invention relates to a novel means for transporting small perishable fruits.

It consists of a basket and a crate in which a number of these baskets are adapted to be suspended, and in details of construction which will be more fully explained by reference to the accompanying drawings, in which—

Figure 1 is a view of the crate containing baskets. Fig. 2 is a view of one of the baskets. Fig. 3 is a transverse section of one of the baskets, showing its construction.

The basket is constructed of thin veneers of wood A which cross each other at right angles and are scored so as to be folded up to form sides which extend upwardly at an angle with the bottom, this portion of the construction being common to the class of veneer baskets.

B is a wooden rim adapted to surround the upper edges of the veneers, and the latter are secured to the rim by wire staples C driven from the inside into the rim. The rim is preferably made of rectangular strips, dovetailed together at the angles, as shown at D and also locked by wire staples driven through the meeting ends to extend diagonally across the angle as shown.

In order to protect the upper or raw edges of the thin up-turned veneers, the strips B are cut with a projecting rib *b* which overhangs toward the interior of the basket, and the upper edges of the veneer sides abut against this rim, and when the staples are driven in to secure them to the bars, the upper ends of the veneers will be concealed and protected by this overhanging lip or rib. Baskets made in this way are exceedingly rigid, and may be carried when full of fruit, either by the rims, by which they are always handled, or if enveloped in paper and tied up with a string, the string crossing over the basket at right angles, serves as a handle by which to carry it, the stiffness of the rim being sufficient to prevent the sides being pressed inwardly and the fruit crushed when carried in this manner. In order to transport these baskets into which the fruit is usually packed as it is gathered, I employ crates F made with sides having horizontal grooves or channels made on their inner faces as shown at G, and of such diameter as to receive the edges of the basket rims so that when the baskets are introduced they are suspended by these rims one above the other to as great a depth as may be found convenient or suitable to make the crate.

The bottom and ends of the crate may be made of transverse strips nailed upon the sides, and the top may be made open, but preferably closed to keep out dust and dirt, the open sides and bottom allowing a free circulation of air through the crate.

The veneers of which the baskets are made are slightly separated at the corners, and are also made with saw cuts along the sides to allow air to circulate freely through them. The baskets being suspended by the projecting rims and being made converging toward the bottom, a free circulation of air beneath and around each of the baskets is possible. This is of great value in preserving the fruit which is usually warm when picked and placed in the baskets, and if the baskets were supported so as to rest upon the bottom the fruit would very soon be spoiled by reason of the heat and the inability to properly ventilate.

Having thus described my invention, what I claim as new, and desire to secure by Letters Patent, is—

1. A fruit basket composed of thin veneers of wood crossing each other at right angles, having up-turned sides, rectangular strips of wood dove-tailed together at the meeting angles to serve as a rim and fastened with corner staples, and wire staples whereby the upper ends of the veneers are fastened to the insides of the rim whereby the latter projects outwardly around the top of the basket in the form of a ledge.

2. A fruit basket composed of thin veneers of wood crossing each other at right angles having the sides up-turned and projecting upwardly around the bottom, a rim consisting of rectangular strips of wood united at the angles and adapted to surround the exterior of the basket rim, an overhanging rib formed on the upper edge of the strips projecting inwardly so as to cover the upper ends of the veneers, and means for securing the veneers to the inner sides of the rim.

3. A fruit basket composed of thin veneers crossing each other at right angles, with upturned sides having a rim, to the interior periphery of which the upper ends of the veneers are secured, said rim projecting outwardly around the periphery of the basket, and a crate having vertical walls with channels or ribs upon which the projecting rims are supported whereby the baskets are suspended from their upper edges, and the bottom and sides left free from contact.

In witness whereof I have hereunto set my hand.

ROSWELL E. MOREY.

Witnesses:
S. H. NOURSE,
H. F. ASCHECK.